W. A. TURBAYNE.
STARTING AND LIGHTING DYNAMO ELECTRIC MACHINE.
APPLICATION FILED FEB. 11, 1915.
1,318,938.
Patented Oct. 14, 1919.
2 SHEETS—SHEET 1.
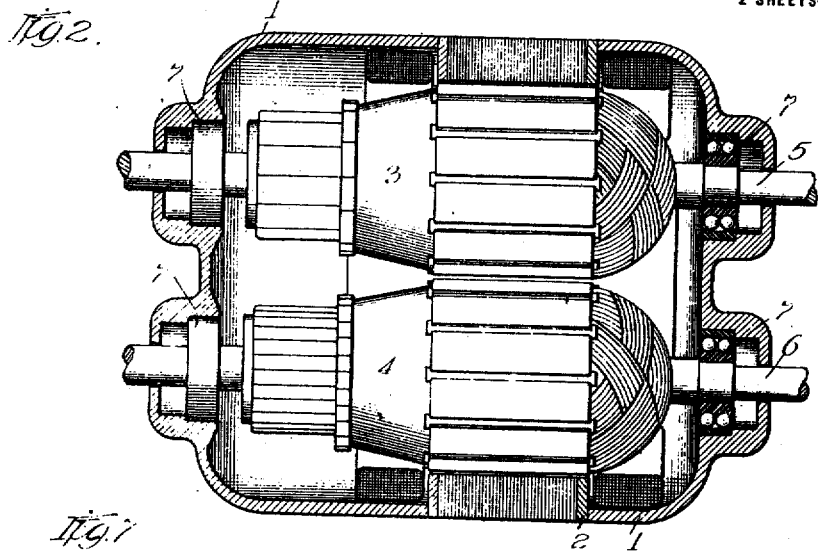
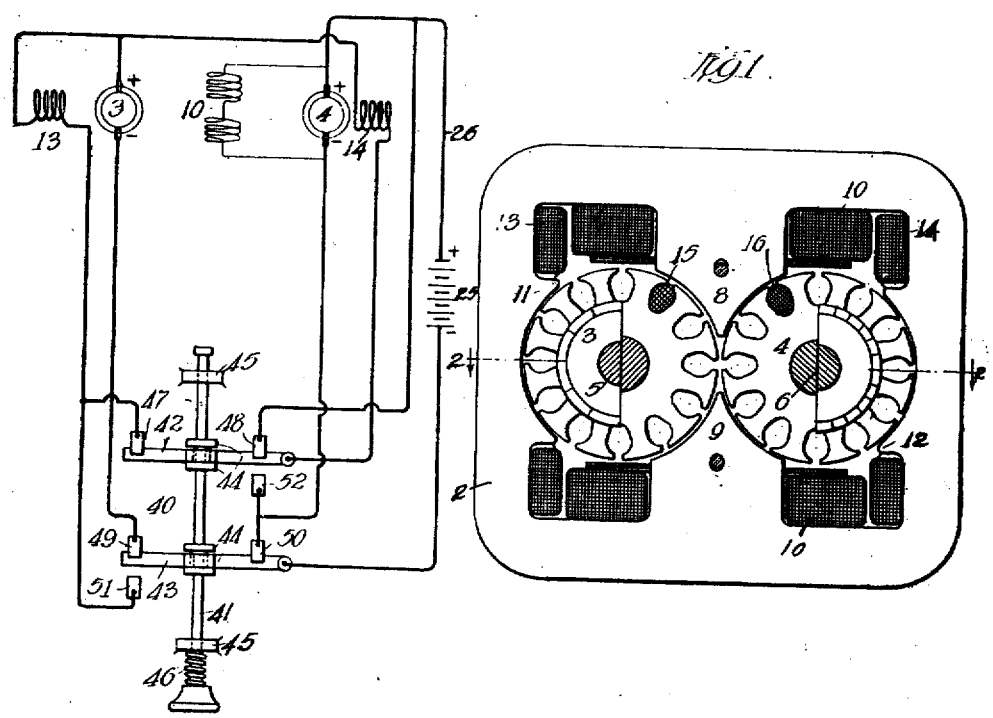

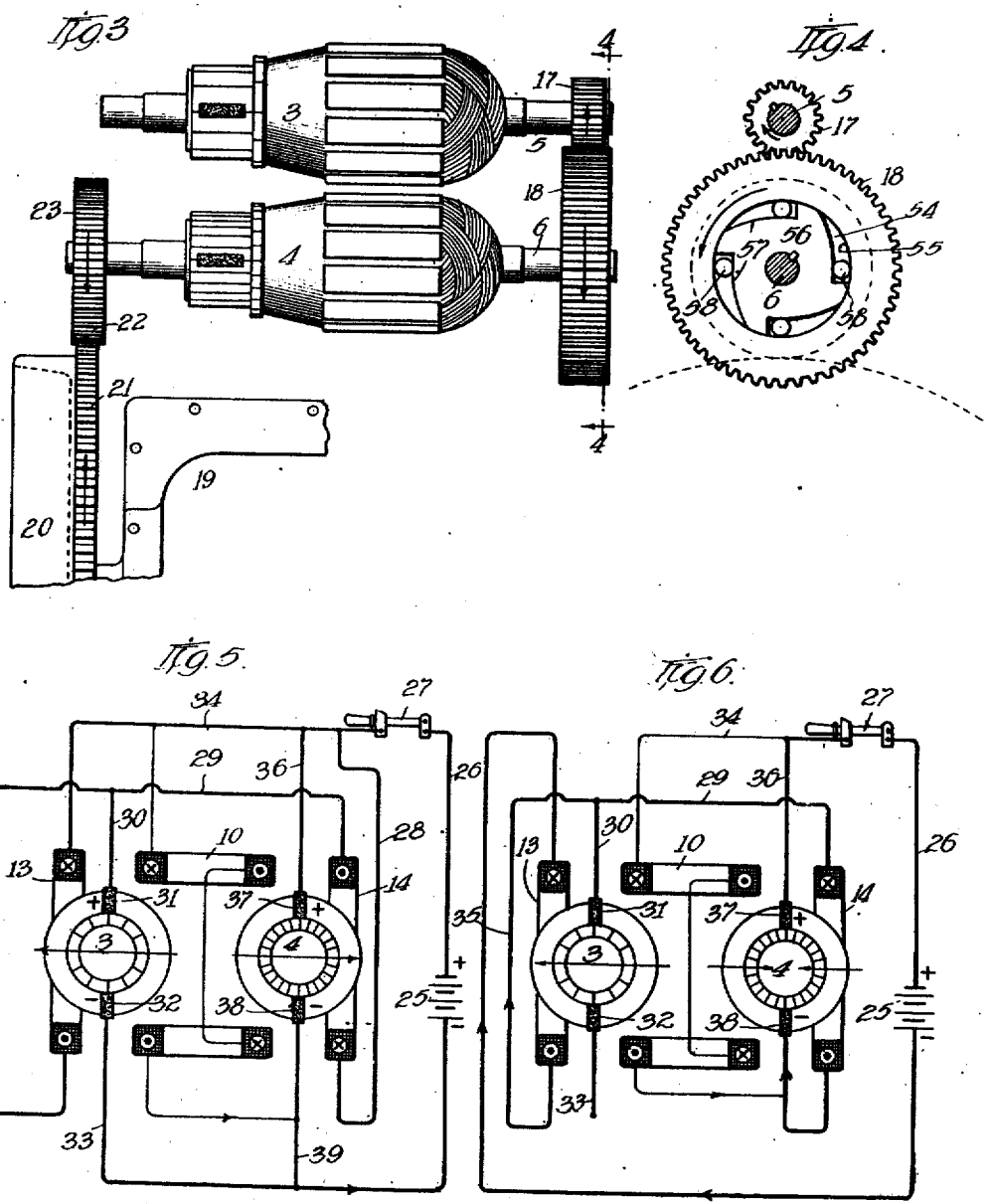

UNITED STATES PATENT OFFICE.

WILLIAM A. TURBAYNE, OF NIAGARA FALLS, NEW YORK, ASSIGNOR TO U. S. LIGHT AND HEAT CORPORATION, OF NIAGARA FALLS, NEW YORK, A CORPORATION OF NEW YORK.

STARTING AND LIGHTING DYNAMO-ELECTRIC MACHINE.

1,318,938.   Specification of Letters Patent.   Patented Oct. 14, 1919.

Application filed February 11, 1915. Serial No. 7,586.

*To all whom it may concern:*

Be it known that I, WILLIAM A. TURBAYNE, a citizen of the United States, residing at Niagara Falls, in the county of Niagara and State of New York, have invented new and useful Improvements in Starting and Lighting Dynamo-Electric Machines, of which the following is a full, clear, concise, and exact description, reference being had to the accompanying drawing, forming a part of this specification.

This invention relates to starting and lighting dynamo-electric machines, and is particularly adapted for starting automobile engines and supplying the energy for the lighting apparatus thereof.

It is one of the objects of the present invention to provide dynamo-electric machinery which may be readily converted from motor to generator functions and which is especially adapted to the peculiar conditions of automobile engine starting and lighting apparatus.

The starting of an automobile engine by an electric motor requires for a brief period a dynamo-electric machine having the capacity of receiving a considerable amount of electrical energy from the storage battery or other source, while the lighting and recharging apparatus requires, for a much longer period of time, a machine capable of delivering a very much smaller amount of electrical energy. It is another object of this invention to provide an effective electric machine wherein all the magnetic material in the composition thereof is usefully employed whether motoring or generating and wherein all the parts operate to advantage without waste of energy or unnecessary wear.

Another object of the invention lies in the provision of a double armature dynamo-electric machine having reliable means for preventing the exchange of current between the armatures.

A further object is to provide a system involving a novel set of connections for the dynamo-electric machinery above referred to.

Still another object of the invention is to provide improved inherent regulating means tending to maintain the generated current within safe limits.

Other objects will be in part obvious and in part pointed out hereinafter.

In the accompanying drawings, wherein is shown one of various possible embodiments of the invention—

Figure 1 is a sectional view of a dynamo-electric machine embodying the present invention.

Fig. 2 is a section taken substantially on the line 2, 2 of Fig. 1.

Fig. 3 is a schematic plan view showing the arrangement of parts, connections between the armatures and connections between the dynamo-electric machine and engine.

Fig. 4 is a sectional view taken upon the line 4, 4 of Fig. 3.

Fig. 5 is a diagram indicating the motoring circuit.

Fig. 6 is a diagram indicating the generating circuit.

Fig. 7 is a simplified diagram showing the means for establishing the different electrical circuits.

In the embodiment herein disclosed, the invention comprises a pair of armatures constructed on separate shafts and coöperatively arranged with a single field structure in a suitable housing. One of the armatures is of low resistance and the other of comparatively high resistance, for reasons which presently will be apparent. When motoring the armatures act cumulatively to convert electrical energy from a storage battery to mechanical energy for engine starting purposes. When generating, however, only the high resistance armature is rotated, but the entire field structure and the low resistance armature are all employed in a regulating scheme which maintains the current output within safe limits. A switching device is also provided for quickly and conveniently establishing the different electrical circuits.

A housing 1 is provided which supports a field yoke 2 the latter surrounding rotary armatures 3 and 4 having respectively the armature shafts 5 and 6 which in turn are mounted in suitable anti-frictional bearings 7 in the housing 1. The yoke 2 has the polar projections 8 and 9 (as shown clearly in Fig. 1) which extend transversely opposite and between the armatures 3 and 4. The field poles 8 and 9 are provided with a winding 10, connected in an electrical circuit with the armatures 3 and 4. The yoke 2 also comprises lateral projections or pole portions 11 and 12 arranged adjacent the respectively opposite sides of the armatures 3 and 4. The projection 11 is provided with a winding 13 and the projection 12 with a winding 14.

The armature 3 carries a small number of active armature conductors 15 of large cross-sectional dimension, as compared with the armature 4, which carries a greater number of active armature conductors 16 of comparatively small cross-sectional dimension. The armature 3 is accordingly of low resistance and the armature 4 of high resistance. The armatures are connected for the transmission of mechanical energy by means of a pinion 17 on the shaft of the armature 3 which meshes with a gear 18 connecting with the shaft of the armature 4. Suitable means are provided for automatically interrupting this mechanical transmission when it is desired to use the machine as a generator. These means will be more particularly described hereinafter.

The internal combustion engine is indicated at 19, (see Fig. 3). This engine has a fly-wheel 20 fixed with its crank shaft and the fly-wheel is formed with suitable gear teeth 21 adapted to mesh with the teeth 22 of a pinion 23 carried by the shaft of the armature 4.

When desired to use the machine for the purpose of starting the engine, the circuit connections are established as shown in Fig. 5. This is accomplished by means of a manually operated switch which later will be described in detail.

Referring now to Fig. 5 of the drawings, a storage battery is indicated at 25 connected with the before-mentioned windings and armatures as follows:—From the positive side of the battery an electrical circuit may be traced through a conductor 26, a main switch 27, a conductor 28, field winding 14, conductors 29 and 30, positive commutator brush 31, armature 3, negative brush 32, conductor 33, back to battery. Another circuit may be traced from the positive side of the battery through the conductor 26, main switch 27, conductor 34, field winding 13, conductors 35, 30, brush 31, armature 3, brush 32, conductor 33 to battery. Still another electrical circuit may be traced from the positive side of the battery through the switch 27, conductor 36, positive brush 37 of the armature 4, through said armature, through the negative brush 38 thereof and conductor 39, back to battery. The field winding 10 is connected directly across the battery terminals. With the apparatus connected as above set forth and as shown in Fig. 5, the current flows through the field windings 13 and 14 in equal quantities and then unites and flows through the armature 3. In Figs. 5 and 6 the direction of current through the field windings is indicated by the crosses and dots appearing thereon, the crosses indicating that the current flows in a downward direction and the dots that the current flows in an upward direction. It will be apparent that with the fields and armatures connected as shown in Fig. 5, and current flowing in the direction indicated by the symbols, the magnetic force created will be in the direction indicated by the horizontal arrows, the projections 8 and 9 and their coöperating windings forming north poles and the projections 11 and 12 and their respective windings forming south poles. By the above described field structure there is created a flux on the armatures 3 and 4 respectively in opposite directions.

Assuming the electrical circuit to be established as shown in Fig. 5, it will be seen that the magnetic flux created will rotate the armature 3 in one direction and the armature 4 in the opposite direction. Each of these armatures is subjected to a substantially equal magnetic flux and because of the mechanical transmission afforded by the pinion 17 and the gear 18, they will act cumulatively to transmit mechanical energy to the pinion 23 and therethrough to the crank shaft of the engine. It will be obvious, therefore, that a considerable mechanical force is produced.

To obtain the force necessary to give the engine of an automobile its initial turning movement or cranking, it is desirable to use a dynamo-electric machine having sufficient iron and copper in its composition to carry sufficient magnetic flux and current to produce a comparatively strong torque, but the period of time ordinarily consumed in starting is so small as to be nearly negligible when compared with the time that a dynamo-electric machine is required to operate to maintain the storage battery or batteries in charged condition, and generally to generate current for the lighting apparatus, etc. Also, the generating device is called upon to deliver a very much smaller amount of electrical energy than is consumed by the motoring device in starting. The present apparatus is therefore especially adapted for use with automobiles, as by a simple switching arrangement, practically automatic in its action, the machine may be converted from a motoring device, consuming a considerable amount of electrical energy from the battery, to a generating device producing a substantially smaller output of electrical energy for recharging the battery and for lighting purposes. Whether generating or motoring, however, no part of the magnetic material of which the machine is composed is idle but it is substantially wholly employed to useful purposes.

An inspection of Fig. 6 of the drawings will reveal the electrical circuits as established for the purpose of operating the device as a generator. It will be noted that the low resistance armature 3 is open-circuited at this time, and that the field windings 13 and 14 are arranged in series with each other and with the high resistance armature 4. Accordingly, the full current flowing to the external circuit passes through the fields 13 and 14. The shunt coil 10 remains connected as when the device is used as a motor. By means of the switching device indicated generally at 40 in Fig. 7, the direction of the flow of current through the field 14 is reversed, so that this winding will act in opposition to the shunt coil 10. The direction of the flow of current through the field 13 is not changed and the magnetic flux created thereby acts to divert a portion of the flux of the shunt coil 10 normally active upon the armature 4. It will be seen that by this arrangement two distinct forces are brought into action, tending to cause a reduction of the flux on the generator armature 4. The winding 14 acts as a differential to reduce the flux through the generator armature by opposing the action of the shunt winding 10, while the winding 13 acts to divert flux from the generator armature by directing it to the left through the portion of the magnetic circuit which includes the now idle armature 3. Through the combined actions of the windings 13 and 14 it is possible to maintain the current delivered by the generator armature at a closely constant value, despite wide variations in speed. The armature 3, although stationary, and not assisting in the generation of useful electromotive force, nevertheless aids in the scheme of self-regulation of the device by acting as a magnetic shunt under influence of the winding 13. It will be apparent, of course, that as the speed of the generator armature increases, tending to increase the amount of current delivered to the external circuit, the windings 13 and 14 being arranged in the external circuit, will develop added force. The winding 13 will act to divert more of the active flux of the shunt field 10, while the winding 14 develops added force in opposition to the force of the shunt field 10. By this arrangement the output of the generator is confined within certain limits.

The switching device 40 comprises a push-rod 41 carrying a pair of bridging members 42, 43, said members being insulated from the rod as indicated at 44. The rod is mounted in suitable bearings 45 and normally held by a spring 46 in position to establish the connections desired for generating. Fig. 7 shows the switching device 40 in position to operate the device as a motor. A pair of contacts 47 and 48 are engaged by the bridging member 42 of the switch, closing the electrical circuit through the battery, the field 13 and field 14. The second pair of contacts 49, 50 are engaged simultaneously by the bridging member 43 of the switch, closing the electrical circuit through the battery, the armature 4, the armature 3 and the shunt field 10. As this arrangement is only necessary for a brief period, the spring 46 is adapted to return the push rod 41 as soon as the operator relieves the pressure thereon. The generating circuit is practically automatically established by the return movement of the push rod 41.

In generating, the current flows from the positive brush of the armature 4, through the conductor 26, battery 25, bridging member 43, contact 51, field winding 13 from top to bottom, field winding 14 from top to bottom, bridging member 42, contact 52, to the negative brush on the armature 4, through said armature and through the shunt winding 10.

An overrunning clutch 54 is interposed between the armatures 3 and 4 and becomes effective to interrupt the mechanical transmission between the armatures when the engine 19 operates by its own power and turns the generator armature at a comparatively high rate of speed. The clutch comprises the gear 18 interiorly recessed at 55, as shown in Fig. 4, and an inner ratchet-shaped member 56 having cam faces 57 adapted to engage the rollers 58 and wedge the same against the annular wall of the recess 55. The ratchet-shaped member 56 is fixed upon the shaft of the generator armature and the cam faces 57 are inclined in a direction which, when the armature shaft turns at a speed greater than the speed imparted to the gear 18, permits the rolls 58 to recede from their position of wedged engagement with the annular wall of the recess 55.

In order that each armature shall develop the same counter electro-motive force when motoring and therefore prevent the exchange of current between them, the machine is constructed with the ratio of the number of active conductors in the two armatures respectively, in inverse proportion to the speed ratio of said armatures as determined by the gear 18 and the pinion 17. As the magnetic field acts equally on both armatures it will be obvious that by the above arrangement and construction equal numbers of lines of force are cut by the same number of conductors per given period of time.

In a machine of the character above described, all of the magnetic material entering into the construction of the machine, including the armatures and all the field windings, is utilized to good advantage in starting when the heaviest work is imposed upon the machine. By a simple switching movement, the machine is transformed into a generator and while generating, all of the field windings and both of the armatures are serving some useful purpose.

The invention is not limited to dynamo-electric machinery in which the two armatures have associated therewith a single field frame. If desired, each armature may have its own field frame, though such construction will not possess all the regulating characteristics referred to above.

In case it should be preferred to mount the two armatures in separate machines, the field structure should direct flux through said armatures in a substantially fixed ratio. That is to say, the flux threading one armature should bear a substantially fixed ratio to the flux threading the other armature. With a predetermined gear ratio of the proper value, which may be determined either by calculation or experiment, no circulation of current from one armature through the other will occur.

As many apparently widely different embodiments of the invention might be made without departing from the scope thereof, it is intended that all matter contained in the foregoing description and shown in the accompanying drawings shall be interpreted as illustrative and not in a limiting sense.

What I claim as new and desire to secure by Letters Patent of the United States is:

1. In apparatus of the character described, in combination, a dynamo-electric machine comprising two armatures supported on separate shafts and arranged to coöperate with a field structure common to both armatures, means adapted to energize said machine to set up magnetic flux through both said armatures simultaneously in opposite directions, power transmitting devices between said armatures whereby movement of one may be imparted to the other in a relatively opposite direction, and an internal combustion engine connecting with said dynamo-electric machine.

2. In apparatus of the character described, in combination, a dynamo-electric machine comprising two armatures, a storage battery, a field structure and connections whereby both armatures are subjected conjointly to the influence of the battery, an internal combustion engine, power transmission devices whereby said engine may be turned over by the combined torque of both armatures when the dynamo-electric machine acts as a motor to start the engine, and means whereby one of said armatures is automatically disconnected operatively from the other when said engine is acting under its own power.

3. In dynamo-electric apparatus, in combination, a pair of armatures, a single field structure coöperatively associated therewith, a source of electrical energy, means comprising conductors whereby said armatures may be caused to act cumulatively as motors, and means whereby said armatures may be automatically disconnected upon the attainment of a predetermined speed by one of said armatures.

4. In dynamo-electric apparatus, in combination, a low resistance armature, a comparatively high resistance armature, a magnetic field structure common to both armatures, means whereby said armatures are connected to act cumulatively for motoring, and means whereby the high resistance armature is adapted to rotate independently of said low resistance armature for generating.

5. In dynamo-electric apparatus, in combination, a low resistance armature, a comparatively high resistance armature, a magnetic field structure common to both armatures comprising a plurality of windings, a storage battery, means whereby certain of said windings may be included in series with said low resistance armature and certain other of said windings may be included in shunt with said armatures, and means whereby the said windings formerly in series with the low resistance armature may be included in series with said high resistance armature.

6. In dynamo-electric apparatus, in combination, a low resistance armature, a comparatively high resistance armature, a magnetic field structure common to both armatures comprising a plurality of windings, a storage battery, means whereby certain of said windings may be included in series with said low resistance armature and certain other of said windings may be included in shunt with said armatures, means whereby the said winding formerly in series with the low resistance armature may be included in series with said high resistance armature, means whereby said armatures are connected to act cumulatively for motoring, and means whereby the high resistance armature is adapted to rotate independently of said low resistance armature for generating.

7. In dynamo-electric apparatus, in combination, a low resistance armature, a comparatively high resistance armature, a magnetic field structure common to both armatures comprising a plurality of windings, a storage battery, and means whereby certain of said windings may be included in series with said low resistance armature and in parallel with each other and certain other of said windings may be included in shunt with said armatures.

8. In dynamo-electric apparatus, in combination, a low resistance armature, a comparatively high resistance armature, a magnetic field structure common to both armatures and comprising a plurality of windings, a storage battery, means whereby certain of said windings may be included in series with said low resistance armature and in parallel with each other and certain other of said windings may be included in shunt with said armatures, and means whereby the said windings formerly in series with the low resistance armature may be included in series with said high resistance armature and in series with each other.

9. In dynamo-electric apparatus, in combination, a low resistance armature, a comparatively high resistance armature, a magnetic field structure common to both armatures and comprising a plurality of windings, a storage battery, means whereby certain of said windings may be included in series with said low resistance armature and in parallel with each other and certain other of said windings may be included in shunt with said armatures, means whereby the said winding formerly in series with the low resistance armature may be included in series with said high resistance armature and in series with each other, means whereby said armatures are connected to act cumulatively for motoring, and means whereby the high resistance armature is adapted to rotate independently of said low resistance armature for generating.

10. In dynamo-electric apparatus, in combination, an armature comprising a number of active conductors, a second armature comprising a greater number of active conductors, a field structure coöperatively associated with said armatures, and gearing between said armatures, the ratio of the number of active conductors on the two armatures respectively being substantially in inverse proportion to the speed ratio of said armatures as determined by said gearing.

11. In dynamo-electric apparatus, in combination, a pair of armatures mounted on different shafts, a single magnetic field structure adapted to coöperate with said armatures, and means whereby the apparatus may be connected to operate with one of said armatures as a generator and with a part of said magnetic field acting in opposition to the effective flux on the said one armature.

12. In dynamo-electric apparatus, in combination, a pair of armatures mounted on different shafts, a single magnetic field structure adapted to coöperate with said armatures, and means whereby the apparatus may be connected to operate with one of said armatures as a generator and with a part of said magnetic field acting to divert a part of the effective flux on the generator armature.

13. In dynamo-electric apparatus, in combination, a pair of armatures mounted on different shafts, a single magnetic field structure adapted to coöperate with said armatures, and means whereby the apparatus may be connected to operate with one of said armatures as a generator, a part of said magnetic field acting in opposition to the effective flux on the generator armature and another part of said magnetic field acting to divert a portion of the effective flux on the generator armature.

14. In dynamo-electric apparatus, in combination, a pair of armatures mounted on different shafts, a single magnetic field structure adapted to coöperate with said armatures, and means whereby the apparatus may be connected to operate with one of said armatures as a generator, a part of said magnetic field acting to divert a part of the effective flux on the generator armature, the latter said part being in series with the generator armature.

15. In dynamo-electric apparatus, in combination, a rotary armature, and a stationary field structure, one portion of said field structure acting to set up a magnetic flux effective upon said armature, another portion of said field structure acting to set up a magnetic flux upon said armature in opposition to said first portion and a third portion of said field structure acting to divert a portion of the effective flux set up by said first portion.

16. In dynamo-electric apparatus, in combination, a rotary armature, and a stationary field structure, one portion of said field structure acting to set up a magnetic flux effective upon said armature, another portion of said field structure acting to set up a magnetic flux upon said armature in opposition to said first portion and a third portion of said field structure acting to divert a portion of the effective flux set up by said first portion, said first portion comprising a winding in shunt with said armature and said other portions comprising windings in series with said armature.

17. In an appliance of the character described, in combination with an internal combustion engine, an electric machine, an armature for said machine, means connected with said armature adapted for driving connection with said internal combustion engine, a second armature for said electric machine, said armatures being adapted to operate cumulatively in motoring, said electric machine having a field structure for causing flux through one of said armatures to bear a substantially fixed ratio to the flux through the other armature, and a clutch mechanism adapted to establish a driving relation between the armatures to start said engine and to disconnect said driving relation upon the engine operating under its own power.

18. In an appliance of the character described, in combination with an internal combustion engine, an electric machine, a pair of armatures for said electric machine, said armatures being adapted to operate cumulatively in motoring, said electric machine having a field structure for causing flux through one of said armatures to bear a substantially fixed ratio to the flux through the other armature, and transmission means connecting said armatures with said internal combustion engine, said transmission means having associated therewith means for interrupting same upon the engine operating under its own power, whereby said engine will drive only one of said armatures as a generator.

19. In an engine starting system, in combination, an internal combustion engine and an electrical unit, said electrical unit having a single field frame, a pair of armatures adapted to operate cumulatively while motoring to start said engine, driving connections between said armatures, and means for interrupting said driving connections when said engine is operating under its own power, whereby said engine will drive only one of said armatures as a generator.

20. In an engine starting system, in combination, an internal combustion engine and an electrical unit, said unit having a pair of armatures and a field structure for causing flux through one of said armatures to bear a substantially fixed ratio to the flux through the other of said armatures, transmission means connecting said armatures with said engine whereby said armatures may operate cumulatively while motoring to start said engine, said transmission means having associated therewith means whereby said engine, when operating under its own power, will drive only one of said armatures.

21. In dynamo-electric apparatus, in combination, a pair of armatures mounted on different shafts, a single magnetic field structure adapted to coöperate with said armatures, and means whereby the apparatus may be connected to operate with one of said armatures as a generator and with the other armature as a by-pass for the diversion of flux from said generator armature.

22. In starting and lighting apparatus, in combination, dynamo-electric machinery having both motoring and generating functions, said machinery comprising two armatures adapted to operate cumulatively during the motoring functions, and means for mechanically disconnecting said armatures during generating functions, said machinery being provided with field structure for causing flux through one of said armatures to bear a substantially fixed ratio to the flux through the other of said armatures.

23. In starting and lighting apparatus, in combination, a pair of armatures, one of which is adapted to have both generating and motoring functions, and means for connecting said other armature to said first armature during motoring functions only, and field means for directing flux through said armatures in substantially fixed ratio.

24. In an appliance of the character described, in combination with an internal combustion engine, an electric generator armature, means connected with said generator armature adapted for permanent connection with said engine, a motor armature, a train of gears adapted to be driven by the motor armature and adapted to actuate the generator armature, both of said armatures being adapted to exert torque cumulatively, a clutch mechanism designed to establish a driving relation between the two armatures to start the engine and to disconnect said driving relation upon the engine operating under its own power, and field means for directing flux through said armatures in substantially fixed ratio.

25. In an appliance of the character described, in combination with an internal combustion engine, a generator armature, means connected to said generator armature for permanent connection with said engine, motor armatures, said armature being adapted to exert torque cumulatively, a train of gears connecting said armature shafts, and an automatic engaging and releasing clutch mechanism coöperating therewith whereby the two armatures may each exert torque to start said engine, the driving connection between said armatures being disconnected automatically through the action of the clutch mechanism upon the engine operating under its own power and remaining disconnected until the motor armature is again operated for starting purposes, and field means for directing flux through said armatures in substantially fixed ratio.

26. In starting and lighting apparatus, in combination, dynamo-electric machinery having both motoring and generating functions, said machinery comprising two armatures adapted to operate cumulatively during the motoring functions, and field structure for causing flux to pass through said armatures in a substantially fixed ratio, means for mechanically disconnecting said armatures during generating functions, a storage battery and means for connecting said armatures to said battery in parallel for motoring functions.

27. In starting and lighting apparatus, in combination, a pair of armatures, one of which is adapted to have both generating and motoring functions, and field structure for causing flux to pass through said armatures in a substantially fixed ratio, means for connecting said other armature to said first armature during motoring functions only, a storage battery, and means for connecting said armatures to said battery in parallel for motoring functions.

28. In an appliance of the character described, in combination with an internal combustion engine, an electric generator armature, means connected with said generator armature adapted for permanent connection with said engine, a motor armature, and field structure for causing flux to pass through said armatures in a substantially fixed ratio, a train of gears adapted to be driven by the motor armature and adapted to actuate the generator armature, both of said armatures being adapted to exert torque cumulatively, a clutch mechanism designed to establish a driving relation between the two armatures to start the engine and to disconnect said driving relation upon the engine operating under its own power, a storage battery, and means for connecting said armatures to said battery in parallel for motoring functions.

29. In an appliance of the character described, in combination with an internal combustion engine, a generator armature, means connected to said generator armature for permanent connection with said engine, a motor armature, said armatures being adapted to exert torque cumulatively, and field structure for causing flux to pass through said armatures in a substantially fixed ratio, a train of gears connecting said armature shafts, an automatic engaging and releasing clutch mechanism coöperating therewith whereby the two armatures may each exert torque to start said engine, the driving connection between said armatures being disconnected automatically through the action of the clutch mechanism upon the engine operating under its own power and remaining disconnected until the motor armature is again operated for starting purposes, a storage battery, and means for connecting said armatures to said battery in parallel for motoring functions.

30. In apparatus of the character described, in combination, dynamo-electric machinery comprising two armatures, and field structure for directing flux through said armatures in a substantially fixed ratio, and power transmitting devices between said armatures whereby movement of one may be imparted to the other, said power transmitting devices being proportioned to effect a speed ratio between said armatures substantially to cause the armature conductors to cut lines of force at equal rates.

31. In apparatus of the character described, in combination, dynamo-electric machinery comprising two armatures, and field structure for directing flux through said armatures in a substantially fixed ratio, means adapted to energize said machine to cause rotation of both said armatures simultaneously, and power transmitting devices between said armatures whereby movement of one may be imparted to the other, said power transmitting devices being proportioned to effect a speed ratio between said armatures substantially to cause the armature conductors to cut lines of force at equal rates.

32. In apparatus of the character described, in combination, dynamo-electric machinery comprising two armatures and field structure for directing flux through said armatures in a substantially fixed ratio, power transmitting devices between said armatures whereby movement of one may be imparted to the other, and an internal combustion engine connecting with said dynamo-electric machine, said power transmitting devices being proportioned to effect a speed ratio between said armatures substantially to cause the armature conductors to cut lines of force at equal rates.

In witness whereof, I have hereunto subscribed my name in the presence of two witnesses.

WILLIAM A. TURBAYNE.

Witnesses:
R. H. VAN NEST,
E. R. KING.